United States Patent
Hyun

(10) Patent No.: US 10,119,602 B2
(45) Date of Patent: Nov. 6, 2018

(54) POWER TRANSMISSION APPARATUS

(71) Applicant: TECHNOVATION PARTNERS CO., LTD., Seoul (KR)

(72) Inventor: Kyung Yul Hyun, Seoul (KR)

(73) Assignee: TECHNOVATION PARTNERS CO., LTD., Seoul (KR)

( * ) Notice: Subject to any disclaimer, the term of this patent is extended or adjusted under 35 U.S.C. 154(b) by 76 days.

(21) Appl. No.: 15/311,834

(22) PCT Filed: May 15, 2015

(86) PCT No.: PCT/KR2015/004892
§ 371 (c)(1),
(2) Date: Nov. 16, 2016

(87) PCT Pub. No.: WO2015/174780
PCT Pub. Date: Nov. 19, 2015

(65) Prior Publication Data
US 2017/0138451 A1    May 18, 2017

(30) Foreign Application Priority Data
May 16, 2014 (KR) .................. 10-2014-0058864

(51) Int. Cl.
*F16H 37/16* (2006.01)
*F16H 37/04* (2006.01)
(Continued)

(52) U.S. Cl.
CPC .......... *F16H 37/041* (2013.01); *B62M 11/06* (2013.01); *B62M 11/145* (2013.01); *F16D 23/12* (2013.01);
(Continued)

(58) Field of Classification Search
None
See application file for complete search history.

(56) References Cited

U.S. PATENT DOCUMENTS 6,386,566 B1   5/2002   Freeberg et al.
8,302,508 B2   11/2012   Chen
(Continued)

FOREIGN PATENT DOCUMENTS

CN    202481239 U    10/2012
CN    103253347 A    8/2013
(Continued)

OTHER PUBLICATIONS

International Search Report for International Patent Application No. PCT/KR2015/004892 filed May 15, 2015.

*Primary Examiner* — Justin Holmes

(57) ABSTRACT

The present invention discloses a power transmission apparatus. The power transmission apparatus includes: an input shaft including a male screw portion formed thereon; a pair of input gears formed on the input shaft to be freely rotatable with the male screw portion being interposed therebetween; an output gear formed to be rotatable in a state of being linked with the pair of input gears; and a power interrupting unit screw-coupled to the male screw portion of the input shaft, and configured to rectilinearly reciprocate along the input shaft by a rotation of the input shaft to be selectively engaged with any one of the pair of input gears so as to transmit a power.

16 Claims, 6 Drawing Sheets

(51) Int. Cl.
    *B62M 11/06*     (2006.01)
    *F16D 23/12*     (2006.01)
    *F16H 1/28*     (2006.01)
    *F16H 1/32*     (2006.01)
    *F16H 25/20*     (2006.01)
    *B62M 11/14*     (2006.01)
    *F16H 3/00*     (2006.01)

(52) U.S. Cl.
    CPC .............. *F16H 1/28* (2013.01); *F16H 1/32* (2013.01); *F16H 3/003* (2013.01); *F16H 3/005* (2013.01); *F16H 25/20* (2013.01); *F16H 37/16* (2013.01); *F16H 25/2018* (2013.01)

(56) References Cited

U.S. PATENT DOCUMENTS

| | | | | |
|---|---|---|---|---|
| 2008/0047797 | A1* | 2/2008 | Hargreaves | F16D 13/28 192/48.2 |
| 2011/0308344 | A1* | 12/2011 | Hyun | F16H 3/083 74/337.5 |
| 2013/0146417 | A1* | 6/2013 | Lee | F16D 23/12 192/93 R |

FOREIGN PATENT DOCUMENTS

| | | |
|---|---|---|
| KR | 10-0141512 B1 | 7/1998 |
| KR | 10-2011-0039179 A | 4/2011 |
| KR | 10-2012-0017807 A | 2/2012 |
| KR | 10-2012-0107239 A | 10/2012 |

\* cited by examiner

POWER TRANSMISSION APPARATUS

CROSS-REFERENCE TO RELATED APPLICATIONS

The present application is a U.S. National Stage of International Patent Application No. PCT/KR2015/004892 filed May 15, 2015, which claims priority to and the benefit of Korean Patent Application No. 10-2014-0058864 filed in the Korean Intellectual Property Office on May 16, 2014, the entire contents of which are incorporated herein by reference.

TECHNICAL FIELD

The present invention relates to a power transmission apparatus, and more particularly, to a power transmission apparatus that selectively converts a speed regardless of an input rotation direction to output a power in the same rotation direction.

BACKGROUND ART

Conventionally, a bicycle includes a pair of wheels, one chain, a pair of pedals, and a handle that allows a passenger to steer the front wheel. The pair of wheels are mounted with a driving sprocket and a driven sprocket, respectively, and are connected to each other via a chain.

Thus, when the passenger steps on the pedals with two feet to rotate the pedals in the advancing direction of the bicycle, the rear wheel connected to the chain is adapted to advance in the advancing direction of the bicycle by a force applied via the rotated pedals.

However, the conventional bicycle is provided with a power transmission apparatus for transmitting a power (e.g., a pair of sprockets and a chain that interconnects the sprockets), and the pedals shall always be rotated forward in order to ride the bicycle.

In this regard, Korean Laid-Open Patent Application No. 10-2011-0039179 discloses a bicycle that is equipped with a power transmission apparatus configured to output a rotation power in the same direction regardless whether pedals are rotated either in the forward direction or in the reverse direction.

In order to output the rotation power in the same direction regardless of the rotating direction of the pedals as disclosed, the bicycle includes a power transmission apparatus that is operated when the pedals are rotated forward, and a power transmission apparatus that is operated when the pedals are rotated reversely.

That is, a pair of power transmission apparatuses are provided in which a chain of one of the power transmission apparatus is wrapped in an open type, and a chain of the other power transmission apparatus is wrapped in a cross type such that when the pedals are rotated in the advancing direction of the bicycle, the one power transmission apparatus is operated to make the bicycle travel forward, and when the pedals are rotated in the reversing direction of the bicycle, the other power transmission apparatus is operated to make the bicycle travel forward.

However, the power transmission apparatuses applied to the bicycle have a problem in that since it is necessary to interpose a one-way clutch in order to keep a power transmission apparatus in the neutral state while the bicycle is traveling, the overall structures and sizes of the power transmission apparatuses are complicated and enlarged.

DETAILED DESCRIPTION OF THE INVENTION

Technical Problem

The present invention has been made in order to solve the above-mentioned problems, and an object of the present invention is to provide a power transmission apparatus that has a structure that is simplified so as to implement the apparatus with a compact size, and is capable of selectively converting a speed regardless of the input rotation direction to output a power in the same rotation direction.

Technical Solution

A power transmission apparatus according to one embodiment of the present invention may include: an input shaft including a male screw portion formed thereon; a pair of input gears formed on the input shaft to be freely rotatable with the male screw portion being interposed therebetween; an output gear formed to be rotatable in a state of being linked with the pair of input gears; and a power interrupting unit screw-coupled to the male screw portion of the input shaft, and configured to rectilinearly reciprocate along the input shaft by a rotation of the input shaft to be selectively engaged with any one of the pair of input gears so as to transmit a power.

The pair of input gears may be formed to have different diameters, and the input gear having a smaller diameter may be linked with the output gear through an idle gear.

The output gear may be formed in a cylindrical structure that accommodates therein the input gears and the input shaft formed with the power interrupting unit, and teeth may be formed on the inner peripheral surface of the output gear to be meshed and linked with the input gears accommodated in the output gear.

The input shaft may be disposed within the output gear to be eccentric to a center of the output gear.

The power interrupting unit may include a loader having a female screw portion formed on an inner peripheral surface thereof to be coupled with the male screw portion and configured to rectilinearly reciprocate along the input shaft, and a plurality of guide rods disposed along the inner peripheral surface of the loader and through the loader, in which the opposite ends of the guide rods may be in close contact with side faces of the input gears that face the loader or the extension portion to be slidable.

The guide rod may be formed in divided structures that are connected to each other by an elastic member.

Advantageous Effects

According to the present invention, a power transmission apparatus may have a simplified structure to be implemented in a compact size, and may selectively convert a speed to output a power in the same direction regardless of an input rotation direction.

MODE FOR CARRYING OUT THE INVENTION

Figure 1:
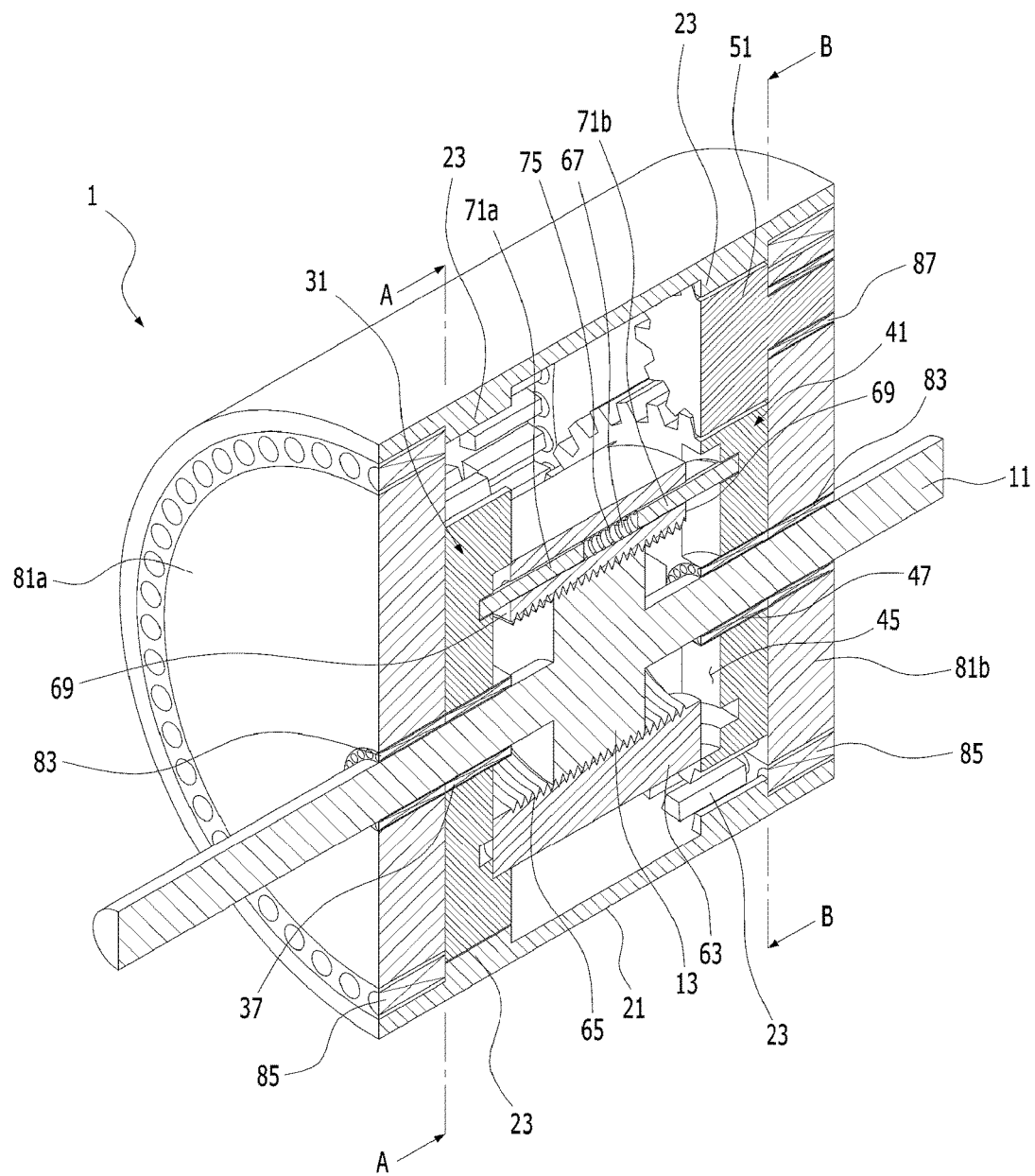
FIG. 1 is a partially-sectional perspective view illustrating a power transmission apparatus according to a first embodiment of the present invention.
Figure 2:
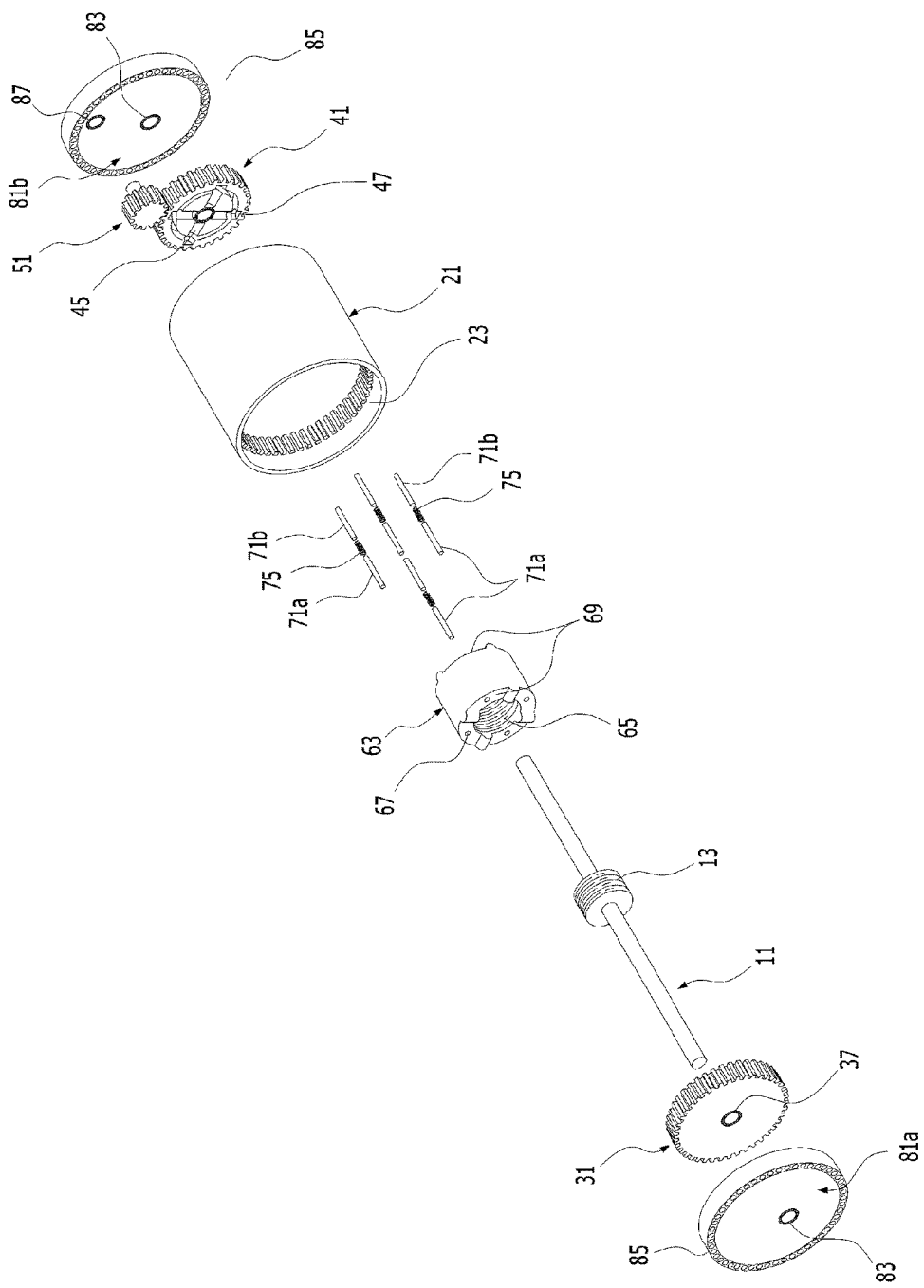
FIG. 2 is an exploded perspective view of FIG. 1.
Figure 3:
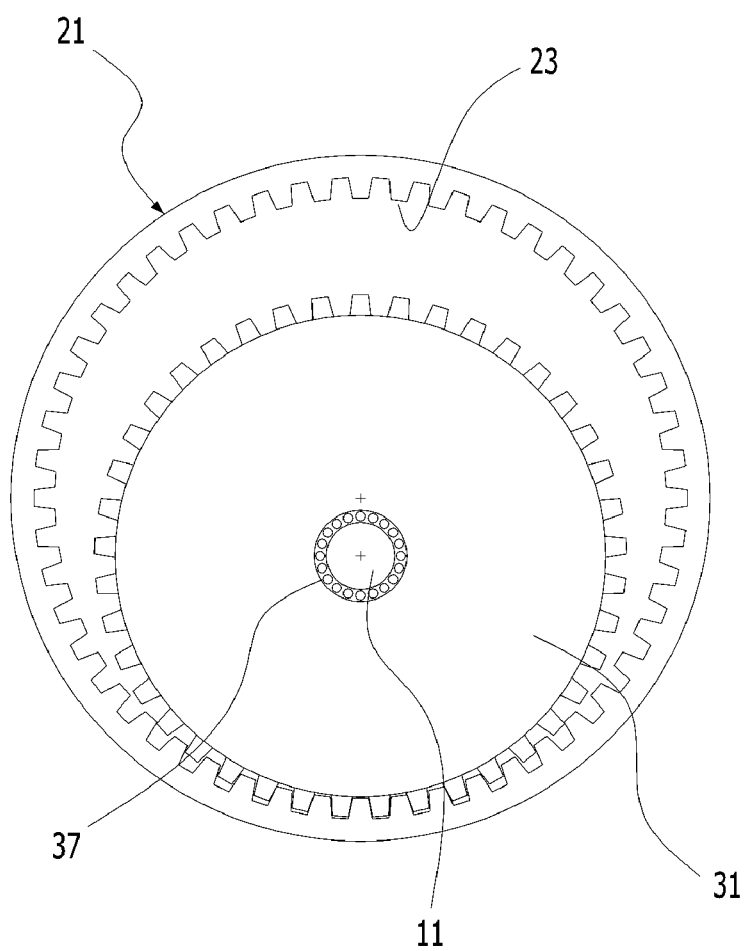
FIG. 3 is a schematic view taken along line A-A in FIG. 1, illustrating an assembly state of an output gear and a first input gear.
Figure 4:
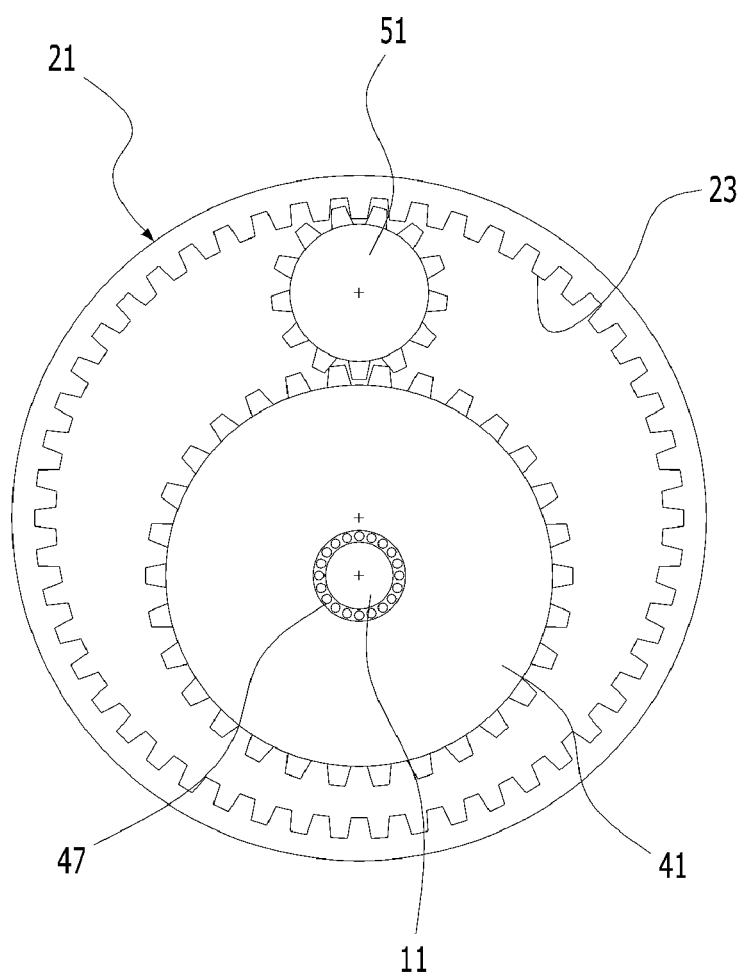
FIG. 4 is a schematic view taken along line B-B in FIG. 1, illustrating an assembly state of the output gear, a second input gear, and an idle gear.

Hereinafter, the present invention will be described in detail with reference to the accompanying drawings.

Prior to description, it is noted that among various embodiments, one embodiment will be representatively described in a manner in which constituent elements having the same configurations will be denoted by the same reference numerals, and for the other embodiments, only the different constructions will be described.

FIGS. 1 to 5 illustrate a power transmission apparatus according to one embodiment of the present invention.

As illustrated in the drawings, a power transmission apparatus 1 according to one embodiment of the present invention includes an input shaft 11, an output gear 21, a first input gear 31, a second input gear 41, an idle gear 51, and a power interrupting unit.

The input shaft 11 has a rod shape having a predetermined length, and includes a male screw 13 formed on a region of an outer peripheral surface thereof. A pedal, a motor, or the like may be connected to the input shaft 11 to generate a rotation power. The input shaft 11 may be installed through the output gear 21 to be concentric to the center of the output gear 21, or to be eccentric to the center of the output gear 21.

The output gear 21 has a ring shape with a hollow circular cross section, and includes a plurality of gear teeth 23 formed on the inner peripheral surface along the circumferential direction, thereby generally having a shape of an inner gear. In the present embodiment, it is illustrated that gear teeth 23 are formed at the opposite ends of the output gear 21, respectively. Without being limited thereto, however, the gear teeth 23 may be formed on the entire inner peripheral surface of the output gear 21. On the outer peripheral surface of the output gear 21, a sprocket on which a chain is mounted or a pulley on which a belt is mounted may be formed so as to output a power input from the input shaft 11.

The first input gear 31 has a shape of an outer gear, and is rotatably supported on the input shaft 11 by a bearing 37. At this time, when the input shaft 11 is concentric to the center of the output gear 21, the input shaft 11 may be rotated in a state of being linked with the output gear 21 by the idle gear. On the contrary, when the input shaft 11 is made to be eccentric to the center of the output gear 21 rather than being concentric to the center of the output gear 21, the first input gear 31 may be rotated in a state of being directly engaged with the output gear 21. Meanwhile, a cam profile 35 with an uneven shape is formed on a side face of the first input gear 31, which faces the loader 63 of the power interrupting unit to be described later. A guide rod 71a to be described later is in close contact with, or slides on, the cam profile 35 of the first input gear 31.

The second input gear 41 has a shape of an outer gear, and is disposed to be spaced apart from the first input gear 31 with a male screw portion 13 of the input shaft 11 being interposed therebetween. The second input gear 41 is rotatably supported on the input shaft 11 by a bearing 47. The diameter of the second input gear 41 is smaller than that of the first input gear 31. Meanwhile, a cam profile 45 with an uneven shape is formed on a side face of the second input gear 41, which faces the loader 63 of the power interrupting unit (e.g., on the side face of the second input gear 41 which is opposite to the first input gear 31). A guide rod 71b to be described later is in close contact with, or slides on, the cam profile 45 of the second input gear 41.

The idle gear 51 has a shape of an outer gear and is interposed between the second input gear 41 and the output gear 21 to be rotated in the state of being meshed with the second input gear 41 and the output gear 21.

The power interrupting unit is screw-coupled to the male screw portion 13, and selectively comes in contact with, or moves away from, the first input gear 31 and the second input gear 41 according to the screw movement of the male screw portion 13 so as to selectively transmit the power of the input shaft 11 to the first input gear 31 and the second input gear 41.

The power interrupting unit includes a loader 63 and guide rods 71a and 71b.

The loader 63 has a ring shape of a hollow circular cross section, and is screw-coupled to the male screw portion 13 of the input shaft 11 to reciprocate along the axial direction of the input shaft 11. On the inner peripheral surface of the loader 63, a female screw portion 65 is formed to be screw-coupled to the male screw portion 13. In addition, along the circumference of the inner peripheral surface of the loader 63, a plurality of through-holes 67, each of which has a circular shape in a cross section, are formed through the loader 63 to be parallel to the axial direction of the input shaft 11.

In addition, on the opposite side faces of the loader 63, which respectively face the first input gear 31 and the second input gear 41, cam profiles 69 are formed, which have uneven shapes to be matched with the cam profiles 35 and 45 formed on the first and second input gears 31 and 41, respectively.

Accordingly, when the cam profile 69 of the loader 63, which faces the first input gear 31, is matched with the cam profile 35 of the first input gear 31 such that the loader 63 and the first input gear 31 come in contact with each other, the loader 63 and the second input gear 41 are spaced apart from each other such that a power transmitted to the loader 63 from the input shaft 11 is transmitted to the first input gear 31, but is not transmitted to the second input gear 41. In addition, when the cam profile 69 of the loader 63, which faces the second input gear 41, is matched with the cam profile 45 of the second input gear 41 such that the loader 63 and the second input gear 41 come in contact with each other, the loader 63 and the first input gear 31 are spaced apart from each other such that a power transmitted to the loader 63 from the input shaft 11 is transmitted to the second input gear 41, but is not transmitted to the first input gear 31.

The guide rods 71a and 71b are provided through the loader 63 to guide the rectilinear reciprocating motion of the loader 63. Each of the guide rods 71a and 71b is a rod having a circular shape in cross section, and the rods 71a and 71b are arranged along the inner peripheral surface of the loader 63 and are coupled through the through-holes 67 of the loader 63, respectively.

Meanwhile, the guide rods 71a and 71b in this embodiment are formed in a pair. The free end of the guide rod 71a, which faces the first input gear 31, is in close contact with, or slides on the cam profile 35 of the first input gear 31, and the free end of the guide rod 71b, which faces the second input gear 41, is in close contact with, or slides on the cam profile 45 of the second input gear 41.

In addition, between the pair of guide rods 71a and 71b, a spring 75 is provided to provide an elastic force so as to cause the guide rods 71a and 71b to come in close contact with the cam profiles 35 and 45 of the first and second input gears 31 and 41, respectively. The spring 75 is inserted into the through-hole 67 of the loader 63 and serves to guide the loader 63 in order to facilitate the movement of the loader 63 when the loader 63 has a weak inertia during the reciprocating of the loader 63.

Here, the guide rods 71a and 71b may be provided in the form of a single rod, rather than being divided into a pair. In addition, the guide rods 71a and 71b may be formed outside the loader 63, rather than being directly formed in the loader 63. When the guide rods 71a and 71b are formed outside the loader 63, the guide rods 71a and 71b may be modified into, or substituted with, various structures to which an elastic member is applied.

Meanwhile, reference numerals 81a and 81b, which are not described above, denote a pair of covers that cover the opposite openings of the output gear 21. On the planar face of each of the covers 81a and 81b, a bearing 83 is provided on which the input shaft 11 is rotatably supported, and on the outer periphery of each of the covers 81a and 81b, a bearing 85 is provided that rotatably supports each of the covers 81a and 81b on the inner periphery of the output gear 21. In addition, the cover 81b located adjacent to the idle gear 51 is provided with a bearing 87 that rotatably supports the idle gear 51.

Next, descriptions will be made on the operation of the power transmission apparatus 1 according to one embodiment of the present invention, which is implemented with the above-described configuration.

First, descriptions will be made on a process of transmitting the power of the input shaft 11 to the output gear 21 through the first input gear 31, for example, a process of transmitting the power in a first mode.

In a neutral state where the loader 63 is positioned in a space between the first input gear 31 and the second input gear 41, the input shaft 11 is rotated in a first direction so as to cause the loader 63 to move toward the first input gear 31, as illustrated in FIG. 1.

As the male screw portion 13 executes a screw turning by the rotation of the input shaft 11, the female screw portion 65 of the loader 63 executes a screw motion to rectilinearly move toward the first input gear 31. At this time, the loader 63 is guided to rectilinearly move by the guide rods 71a and 71b.

Subsequently, the cam profiles 69 and 35 of the loader 63 and the first input gear 31 are matched with each other to be in contact with each other. As a result, the power of the input shaft 11 is transmitted to the first input gear 31 via the loader 63, and the power transmitted to the first input gear 31 is output to the outside through the output gear 21.

At this time, because the cam profiles 69 and 45 of the loader 63 and the second input gear 41 are spaced apart from each other without being matched with each other, the power of the input shaft 11 is not transmitted to the second input gear 41, and the idle gear 51, which is rotated by being engaged with the output gear 21 and the second input gear 41, which rotated by being engaged with the idle gear 51, idle with respect to the input shaft 11. In addition, the free end of the guide rod 71b, which faces the second input gear 41, slides on the cam profile 45 of the second input gear 41.

Next, descriptions will be made on a process of transmitting the power of the input shaft 11 to the output gear 21 through the second input gear 41, for example, a process of transmitting the power in a second mode.

Figure 5:
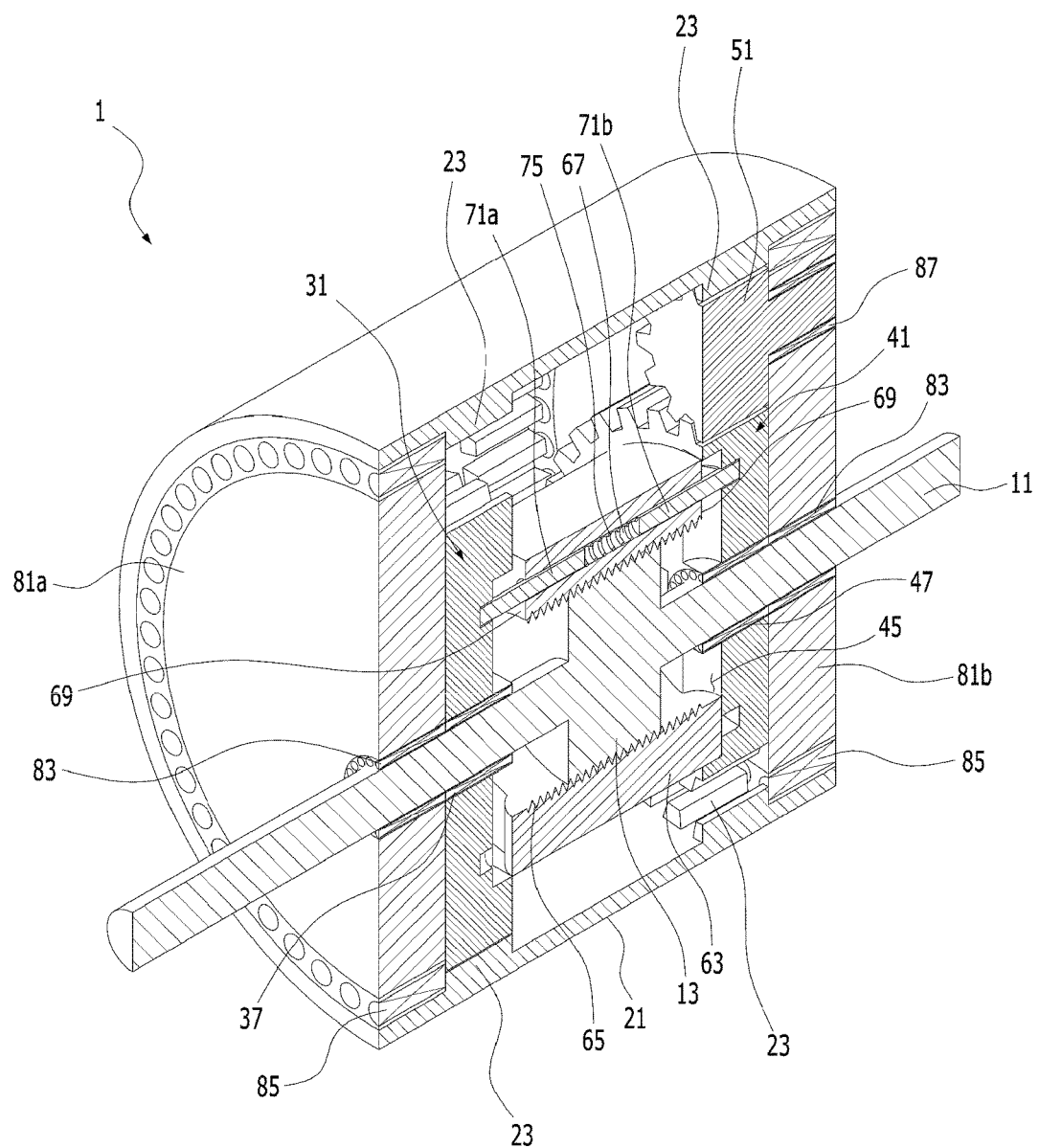
FIG. 5 is a partially-sectional perspective view corresponding to FIG. 1, illustrating a state in which a loader is in contact with the second input gear to transmit a power.

In a state where the loader 63 is positioned in a space between the first input gear 31 and the second input gear 41, the input shaft 11 is rotated in a second direction, which is opposite to the first direction, so as to cause the loader 63 to move toward the second input gear 41, as illustrated in FIG. 5.

As the male screw portion 13 executes a screw turning by the rotation of the input shaft 11, the female screw portion 65 of the loader 63 executes a screw motion to rectilinearly move toward the second input gear 41. At this time, the loader 63 is guided to rectilinearly move by the guide rods 71a and 71b.

Subsequently, the cam profiles 69 and 45 of the loader 63 and the second input gear 41 are matched with each other to be in contact with each other. As a result, the power of the input shaft 11 is transmitted to the second input gear 41 via the loader 63, and the power transmitted to the second input gear 41 is output to the outside via the idle gear 51 and through the output gear 21.

At this time, the output gear 21 rotates in the same rotation direction as the first mode, but the rotating speed of the output gear 21 is relatively low compared to that in the first mode. At this time, because the cam profiles 69 and 35 of the loader 63 and the first input gear 31 are spaced apart from each other without being matched with each other, the power of the input shaft 11 is not transmitted to the first input gear 31, and the first input gear 31 engaged with the output gear 21 to be rotated idles with respect to the input shaft 11. In addition, the free end of the guide rod 71a, which faces the first input gear 31, slides on the cam profile 35 of the first input gear 31.

Meanwhile, the power transmission apparatus 1 according to one embodiment of the present invention also structurally serves as a one-way clutch.

For example, when the output gear 21 is rotated at a faster speed than the input shaft 11 in the state where the loader 63 is matched with the first input gear 31 so that the power of the input shaft 11 is transmitted to the output gear 21 through the first input gear 31, the female screw portion 65 of the loader 63 is rotated faster than the male screw portion 13 of the input shaft 11. Thus, the loader 63 is moved toward the second input gear 41 to be spaced apart from the first input gear 31, and as a result, the power of the input shaft 11 is not transmitted to the first and second input gears 31 and 41 so that the power transmission apparatus becomes the neutral state.

When the loader 63 is rotated faster than the first input gear 31 again in the neutral state, the loader 63 is moved toward the first input gear 31 so that the cam profiles 69 and 35 of the loader 63 and the first input gear 31 are matched with, and come in contact with, each other, thereby outputting the power of the input shaft 11 via the loader 63 and the first input gear 31 and through the output gear 21.

Meanwhile, because the one-way clutch function between the loader 63 and the second input gear 41 is the same as the above-mentioned one-way clutch function between the loader 63 and the first input gear 31, the descriptions of the specific mutual relationships between the loader 63 and the second input gear 41 will be omitted.

Accordingly, in the power transmission apparatus 1 according to one embodiment of the present invention, when the output gear 21 is rotated faster than the input shaft 11, the power transmission apparatus 1 becomes the neutral state so that the power of the input shaft 11 is not transmitted to the output gear 21.

Figure 6:
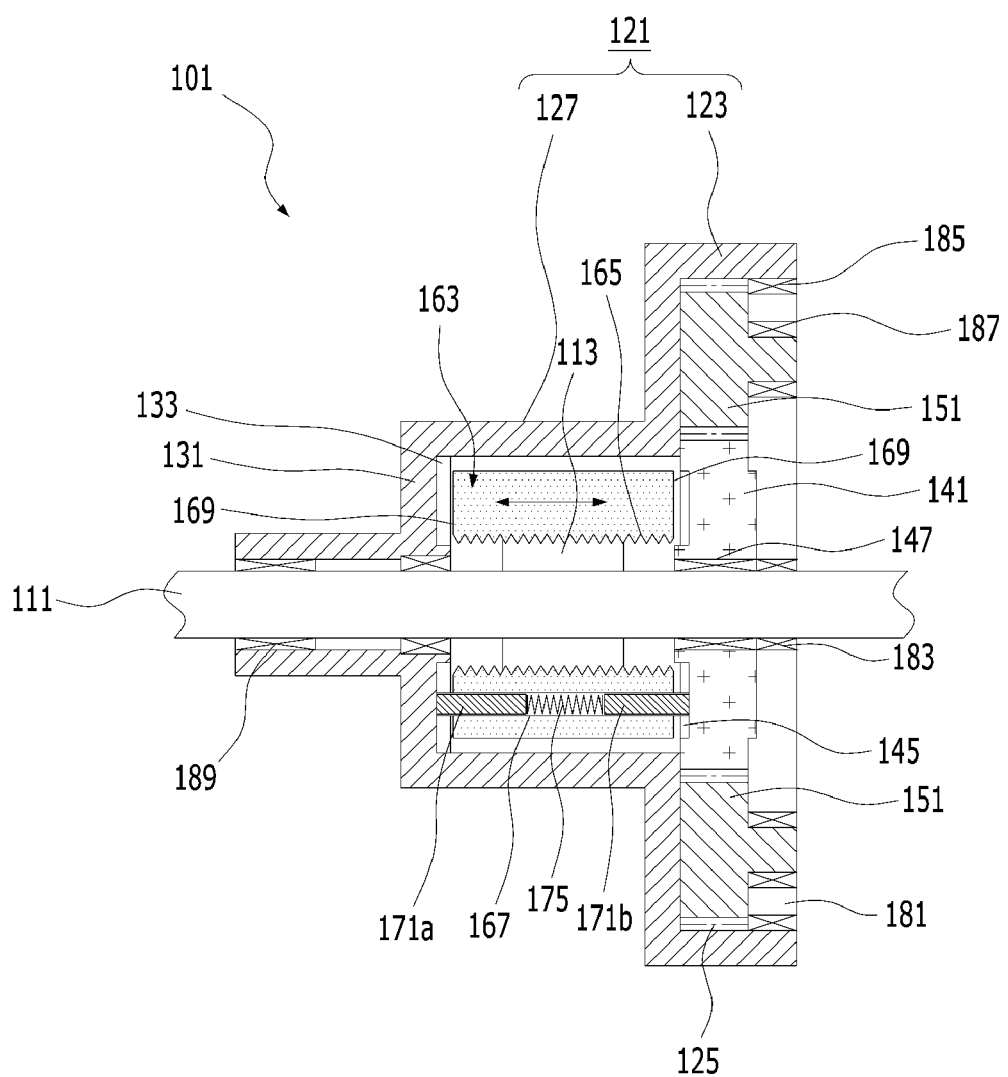
FIG. 6 is a sectional view of a power transmission apparatus according to a second embodiment of the present invention.

FIG. 6 illustrates a sectional view of a power transmission apparatus according to a second embodiment of the present invention. As illustrated in the drawing, unlike that of the above-described first embodiment, the power transmission apparatus 101 according to the second embodiment of the present invention includes an input shaft 111 that is disposed therethrough to be concentric to an output shaft 121, and a male screw portion 113 that is formed in one region of the outer peripheral surface of the input shaft 111.

The output shaft 121 has a hollow cylindrical shape, and includes an inner gear portion 123 having a plurality of gear teeth 125 that are formed on the inner peripheral surface of one side of the inner gear portion 123 along the circumferential direction, and an extension portion 127 that are formed to extend along an axial direction from the inner gear portion 123.

The extension portion 127 is formed to extend while forming a step of which the diameter is reduced from the inner gear portion 123. Meanwhile, a cam portion 131, which is formed with a cam profile 133 having an uneven shape, is provided on the inner face of the extension portion 127 that faces a loader 163 of a power interrupting unit to be described later. A guide rod 171a to be described later is in close contact with, or slides on, the cam profile 133 of the cam portion 131.

In addition, unlike that of the above-described first embodiment, the power transmission apparatus 101 of the second embodiment includes one input gear 141.

The input gear 141 has a shape of an outer gear, and is disposed to be spaced apart from the cam portion 131 of the extension portion 127 with a male screw portion 113 of the input shaft 111 being interposed therebetween. The input gear 141 is rotatably supported on the input shaft 111 by a bearing 147. Meanwhile, a cam profile 145 having an uneven shape is formed on a side face of the input gear 141, which faces the loader 163 of the power interrupting unit. A guide rod 171b is in close contact with, or slides on, the cam profile 145 of the input gear 141.

A planetary gear 151 having a shape of an outer gear is interposed between the input gear 141 and the output shaft 121 to be rotated in the state of being meshed with the input gear 141 and the inner gear portion 123 of the output shaft 121.

The power interrupting unit is screw-coupled to the male screw portion 113, and selectively comes in contact with or moves away from the cam portion 131 of the extension portion 127 and the input gear 141 according to the screw movement of the male screw portion 113 so as to selectively transmit the power of the input shaft 111 to the extension portion 127 and the input gear 141.

The power interrupting unit includes a loader 163 configured to reciprocate while forming a female screw portion 165 on the inner peripheral surface thereof to be screw-coupled to the male screw portion 113, and guide rods 171a and 171b configured to guide the rectilinear reciprocating motion of the loader 163.

The guide rods 171a and 171b are formed in a pair, and are coupled through through-holes of the loader 163. Between the pair of guide rods 171a and 171b, a spring 175 is provided to provide an elastic force so as to cause the guide rods 171a and 171b to come in close contact with the extension portion 127 and the input gear 141, respectively. The free end of the guide rod 171a, which faces the camp portion 131, is in close contact with, or slides on the cam profile 133 of the cam portion 131. The free end of the guide rod 171b, which faces the input gear 141, is in close contact with, or slides on the cam profile 145 of the input gear 141.

In addition, the power transmission apparatus 101 according to the second embodiment of the present invention includes a cover 181 configured to cover an opening that is located adjacent to the inner gear portion 123 of the output shaft 121. In addition, on a planar face of the cover 181, a bearing 183 is provided on which the input shaft 111 is rotatably supported, and on the outer periphery of the cover 181, a bearing 185 is provided that rotatably supports the cover 181 on the inner periphery of the output shaft 121. Further, the cover 181 is provided with a bearing 187 that rotatably supports the planetary gear 151.

Here, reference numeral 189, which has not been described, denotes a bearing that is accommodated in the output shaft 121 to rotatably support the input shaft 111.

Next, descriptions will be made on a power transmission process in a first mode in which, with the above-described configuration, the power of the input shaft 111 is transmitted to the extension portion 127 in the neutral state where the loader 163 is positioned in a space between the cam portion 131 of the extension portion 127 and the input gear 141.

When the loader 163 is moved leftward in FIG. 6 for the convenience of description from the neutral state, for example, when the input shaft 111 is rotated in a first direction such that the loader 163 is moved toward the cam portion 131, as the male screw portion 113 performs a screw turning, the female screw portion 165 of the loader 163 is rectilinearly moved toward the cam portion 131 while performing a screw movement, and the respective cam profiles 169 and 133 of the loader 163 and the cam portion 131 are matched with each other to come in contact with each other. At this time, the loader 163 is guided to rectilinearly move by the guide rods 171a and 171b.

Consequently, the power of the input shaft 111 is transmitted to the output shaft 121 via the loader 163 and the cam portion 131. At this time, because the respective cam profiles 169 and 145 of the loader 163 and the input gear 141 are spaced apart from each other without being matched with each other, the power of the input shaft 111 is not transmitted to the second input gear 141, and the planetary gear 151 rotated by being engaged with the inner gear portion 123 of the output shaft 121 and the input gear 141 rotated by being engaged with the idle gear 151 idle with respect to the input shaft 111. In addition, the free end of the guide rod 171b, which faces the second input gear 141, slides on the cam profile 145 of the input gear 141.

Next, descriptions will be made on a power transmission process of a second mode in which the power of the input shaft 111 is transmitted to the input gear 141 when the power transmission unit 101 according to the second embodiment of the present invention is in the neutral state.

When the loader 163 is moved rightward in FIG. 6 for the convenience of description from the neutral state, for example, when the input shaft 111 is rotated in a second direction, which is opposite to the first direction, so as to cause the loader 163 to move toward the cam portion 141, as the male screw portion 113 performs a screw turning, the female screw portion 165 of the loader 163 is rectilinearly moved toward the cam portion 141 while performing a screw movement, and the respective cam profiles 169 and 133 of the loader 163 and the cam portion 141 are matched with each other to come in contact with each other.

Consequently, the power of the input shaft 111 is transmitted to the output shaft 121 via the loader 163, the input gear 141, and the planetary gear 151. At this time, the output shaft 121 rotates in the same rotation direction as the first mode, but the rotating speed of the output shaft 121 is relatively low compared to that in the first mode. In addition, because the respective cam profiles 169 and 133 of the loader 163 and the cam portion 131 are spaced apart from each other without being matched with each other, the power of the input shaft 111 is not transmitted to the extension portion 127 of the output shaft 121. In addition, the free end of the guide rod 171a, which faces the cam portion 131, slides on the cam profile 133 of the cam portion 131.

Meanwhile, because the one-way clutch operation of the power transmission apparatus 101 according to the second embodiment of the present invention is the same as the above-described operation of the power transmission apparatus 1 according to the first embodiment of the present invention, descriptions thereof will be omitted.

As described above, according to the present invention, a power transmission apparatus may have a simplified structure to be implemented in a compact size, and may selectively convert a speed to output a power in the same direction regardless of an input rotation direction.

In the above-described embodiments, it has been described that the technical idea of the present invention is applied to a power transmission apparatus of bicycle pedals, but, without being limited thereto, the technical idea is applicable to a power transmission apparatus using various power sources, such as a motor and an engine.

It is evident to a person ordinarily skilled in the art that the present invention is not limited to the described embodiments, and various changes and modifications can be made without departing from the technical idea and scope of the present invention. Accordingly, the changes and modifications shall be deemed as belonging to the scope of the present invention that is defined by the accompanying claims.

The invention claimed is:

1. A power transmission apparatus comprising:
an input shaft including a male screw portion formed thereon;
a pair of input gears formed on the input shaft to be freely rotatable with the male screw portion being interposed therebetween;
an output gear formed to be rotatable in a state of being linked with the pair of input gears; and
a power interrupting unit screw-coupled to the male screw portion of the input shaft, and configured to rectilinearly reciprocate along the input shaft by a rotation of the input shaft to be selectively engaged with any one of the pair of input gears so as to transmit a power,
wherein the pair of input gears are formed to have different diameters, and an input gear having a smaller diameter is linked with the output gear through an idle gear.

2. The power transmission apparatus of claim 1, wherein the output gear is formed in a cylindrical structure that accommodates therein the input gears and the input shaft formed with the power interrupting unit, and teeth are formed on an inner peripheral surface of the output gear to be meshed and linked with the input gears accommodated in the output gear.

3. The power transmission apparatus of claim 1, wherein the input shaft is disposed within the output gear to be eccentric to a center of the output gear.

4. The power transmission apparatus of claim 1, wherein the power interrupting unit includes:
a loader having a female screw portion formed on an inner peripheral surface thereof to be coupled with the male screw portion, and configured to rectilinearly reciprocate along the input shaft, and
a plurality of guide rods disposed along the inner peripheral surface of the loader and through the loader, opposite ends of the guide rods being in close contact with side faces of the input gears that face the loader or the extension portion to be slidable.

5. The power transmission apparatus of claim 4, wherein the guide rod is formed in divided structures that are connected to each other by an elastic member.

6. A power transmission apparatus comprising:
an input shaft including a male screw portion formed thereon, and configured to be rotatable in a forward/reverse direction;
a power interrupting unit screw-coupled to the male screw portion, and configured to rectilinearly reciprocate along the input shaft by a rotation of the input shaft;
a pair of input gears formed on the input shaft to be freely rotatable with the power interrupting unit being interposed therebetween, and configured to be selectively engaged with the power interrupting unit to be rotated according to a movement of the power interrupting unit; and
an output gear formed to be rotatable in a state of being selectively linked with the pair of input gears,
wherein both the pair of input gears configured to be selectively engaged with the power interrupting unit to be rotated are rotated in a same direction, and
wherein the pair of input gears are formed to have different diameters, and an input gear having a smaller diameter is linked with the output gear through an idle gear.

7. The power transmission apparatus of claim 6, wherein the output gear is formed in a cylindrical structure that accommodates therein the input gears and the input shaft formed with the power interrupting unit, and teeth are formed on an inner peripheral surface of the output gear to be meshed and linked with the input gears accommodated in the output gear.

8. The power transmission apparatus of claim 7, wherein the input shaft is disposed within the output gear to be eccentric to a center of the output gear.

9. The power transmission apparatus of claim 6, wherein the power interrupting unit includes:
a loader having a female screw portion formed on an inner peripheral surface thereof to be coupled with the male screw portion, and configured to rectilinearly reciprocate along the input shaft, and
a plurality of guide rods disposed along the inner peripheral surface of the loader and through the loader, opposite ends of the guide rods being in close contact with side faces of the input gears that face the loader or the extension portion to be slidable.

10. The power transmission apparatus of claim 9, wherein the guide rod is formed in divided structures that are connected to each other by an elastic member.

11. A power transmission apparatus comprising:
an input shaft including a male screw portion formed thereon;
an input gear formed at a side of the input shaft to be freely rotatable;
an output gear formed to be divided into an inner gear portion that is coupled to be rotatable in a state of being linked with the input gear, and an extension portion that extends from the inner gear portion in a direction of the input shaft, and is coupled to the input shaft to be freely rotatable; and
a power interrupting unit coupled to the male screw portion of the input shaft, and configured to rectilinearly move along the input shaft by a rotation of the input shaft to be selectively engaged with the input gear or the extension portion of the output gear so as to transmit a power,
wherein the input gear is linked with the inner gear portion through a planetary gear.

12. The power transmission apparatus of claim 11, wherein the power interrupting unit includes:
a loader having a female screw portion formed on an inner peripheral surface thereof to be coupled with the male screw portion, and configured to rectilinearly reciprocate along the input shaft, and
a plurality of guide rods disposed along the inner peripheral surface of the loader and through the loader, opposite ends of the guide rods being in close contact with side faces of the input gears that face the loader or the extension portion to be slidable.

13. The power transmission apparatus of claim 12, wherein the guide rod is formed in divided structures that are connected to each other by an elastic member.

14. A power transmission apparatus comprising:
an input shaft including a male screw portion formed thereon, and configured to be rotatable in a forward/reverse direction;
a power interrupting unit screw-coupled to the male screw portion, and configured to rectilinearly reciprocate along the input shaft by a rotation of the input shaft;
an input gear formed on the input shaft to be freely rotatable, and configured to be engaged with the power interrupting unit to be rotated according to a movement of the power interrupting unit; and
an output gear formed to be divided into an inner gear portion that is coupled to be rotatable in a state of being linked with the input gear, and an extension portion that extends from the inner gear portion in a direction of the input shaft, and is coupled to the input shaft to be freely rotatable,
wherein a rotation of the input gear selectively engaged with the power interrupting unit and a rotation of the output gear by a rotation of the extension portion are performed in a same direction, and
wherein the input gear is linked with the inner gear portion through a planetary gear.

15. The power transmission apparatus of claim 14, wherein the power interrupting unit includes:
a loader having a female screw portion formed on an inner peripheral surface thereof to be coupled with the male screw portion, and configured to rectilinearly reciprocate along the input shaft, and
a plurality of guide rods disposed along the inner peripheral surface of the loader and through the loader, opposite ends of the guide rods being in close contact with side faces of the input gears that face the loader or the extension portion to be slidable.

16. The power transmission apparatus of claim 15, wherein the guide rod is formed in divided structures that are connected to each other by an elastic member.

* * * * *